United States Patent Office 2,933,416
Patented Apr. 19, 1960

2,933,416

PROCESS FOR FIXING PIGMENTS ON FIBROUS MATERIALS

Hermann Haakh, Bad Soden (Taunus), and Alfred Rückert, Frankfurt am Main, Germany, assignors to Farbwerke Hoechst Aktiengesellschaft vormals Meister Lucius & Brüning, Frankfurt am Main, Germany, a corporation of Germany No Drawing. Application April 26, 1955
Serial No. 504,095

6 Claims. (Cl. 117—103)

The present invention relates to a process for fixing pigments on fibrous materials.

It is known that pigments can be fixed with the aid of an aqueous solution or dispersion prepared from natural substances of high molecular weight containing carboxylic groups, or polymers in conjunction with polyfunctional ethylene imine compounds. There have also been used for this purpose aqueous dispersions of polymers free from reactive groups, and aqueous solutions or dispersions of polymers containing reactive groups together with polyfunctional ethylene imine compounds or masked poly-isocyanates. It is also known to use a solution or dispersion of a substance of high molecular weight containing carboxylic groups in conjunction with a substance which under the action of heat reacts as a poly-isocyanate or liberates a free poly-isocyanate. It is also known that the disadvantages attendant upon the use of swellable thickening agents can be avoided by using oil-in-water emulsions as thickening agents. Consequently, oil-in-water emulsions have been used as thickening agents in the fixation of pigments by means of polymerization compounds which still contain reactive groups, or by means of polyfunctional compounds.

Now we have found that pigment dyestuffs can be fixed on fibrous materials in a manner which is especially resistant to mechanical treatment in the washing liquors, by applying to the fibrous material an aqueous alkaline solution or dispersion of a pigment, an alkali-soluble resinous condensate containing reactive carboxylic acid groups and obtained by reacting a polybasic acid with a polyhydric alcohol, and a polyfunctional compound the functional groups of which contain a three-membered ring system containing a nitrogen atom or an oxygen atom, drying the treated material, and then subjecting it to the action of heat, if desired, in the presence of steam.

In addition to the resinous condensate described above, there may be used another natural or artificial resin which may also contain reactive groups. There may also be added softening agents or agents accelerating the condensation.

As thickening agents there come into consideration swellable substances, such as alginates, cellulose ether carboxylic acids and gum tragacanth. Such swellable thickening agents can, if desired, be replaced with advantage by organic solvents which are present in the inner phase and are immiscible or only sparingly miscible with water.

As resinous condensates there may be mentioned, for example, incompletely condensed polyhydric alcohol-polycarboxylic acid reaction products which still contain free carboxylic groups (cf. Scheiber, Chemie und Technologie der künstlichen Harze, Stuttgart, 1943, pages 295 et seq.). As further additions there may be mentioned, for example, emulsifiers, protective colloids, softening agents, such as dibutyl phthalate, and natural or artificial resins, for example, caoutchouc or carbamide resins, or their conversion products, drying or non-drying oils and polymerization products which may contain reactive groups.

As polyfunctional compounds the functional groups of which contain a three-membered ring system and contain a nitrogen or oxygen atom, and which are capable of reacting with reactive groups, there may be mentioned, for example, polyfunctional ethylene imine compounds corresponding to the formula:

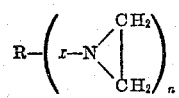

in which R represents a polyvalent aliphatic, isocyclic or heterocyclic radical, $x$ represents one of the groups $-NH-CO-$, $-CO-$, $-SO_2-$, $-O-CO-$ or $-O-CH_2-$, and in which $n$ indicates that the ethylene imine radical should be present at least twice; and compounds corresponding to the formula:

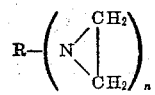

in which R represents a polyvalent radical, for example, $-CO-$, $-SO_2-$, $-SO-$, $=PO-$, $=PS-$.

$-(CH_2)_2-NH-CO-CO-NH-(CH_2)_2-$ or

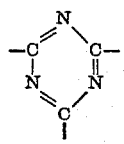

and in which $n$ indicates that the ethylene imine radical should be present at least twice.

There may also be used mixtures of different alkylene imine compounds which contain at least two alkylene imine groups, or mixtures of alkylene imine compounds of the kind hereinbefore described with mono-alkylene imine compounds.

There may also be mentioned, for example, the reaction products of epichlorhydrin with glycide or polyhydric alcohols or amines, and, furthermore, polyfunctional epoxides, for example, diglycide ether

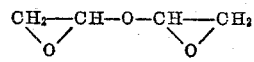

and the butadiene dioxide

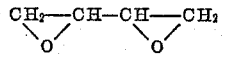

As thickening agents there come into consideration, for example, alginates, vegetable mucilages, carob bean flour, dextrin, cellulose ether carboxylic acids, salts of polyacrylic acid and polyvinyl alcohol. If these substances are used, account should be taken of the fact that the addition of large amounts of those substances causes an undesirable hardening of the prints. To obtain printing compositions which can be used immediately without being after-treated, it is advantageous to use thickening agents which have been prepared by emulsifying a water-insoluble or only sparingly water-soluble organic solvent in water in such a manner that the solvent is in the inner phase. The use of such known oil-in-water emulsions leads to all the advantages of purely aqueous printing colours or dye-baths, such as their capacity for being diluted with water, their lower inflammability as compared with water-in-oil emulsions and the ease with which they can be washed off machine parts, so that the disadvantages usually attendant upon the use of swellable thickening agents, for example, their stiffening of the feel, their inferior fastness to washing and rubbing, inferior brilliancy and their lower colouring strength, are avoided. However, mixtures of swellable thickening agents and oil-in-water-emulsions may be used, as in some cases this improves the stability of the printing pastes or padding liquors.

For the preparation of such highly viscous, mobile oil-in-water-emulsions there are suitable, for example, hydrocarbons, such as benzine, toluene or xylene, and chlorinated hydrocarbons. The boiling points of these solvents should preferably not be below 70° C. The upper limit of the boiling point is advantageously so selected that on drying the fibrous material the solvents present volatilize as completely as possible. When a water-insoluble resin is used as binding agent, it may either be emulsified in the solution or dispersion of the resinous condensate or dissolved in the solvent used for preparing the emulsion.

The oil-in-water-emulsions may be prepared by methods in themselves known, for example, by stirring the organic solvent into a previously prepared aqueous solution of the emulsifier, for example, an aqueous solution of a protein or hydroxyethylated compound. The emulsions may also be prepared by mixing, while stirring vigorously, the aqueous alkaline solution of the salt of a resinous condensate, which also acts as an emulsifier, in small portions with the organic solvent, if desired, in the presence of a protective colloid.

If the pigment padding process is to be used, it is not necessary in all cases to add a thickening agent.

As pigments suitable for use in the process of this invention there may be mentioned, for example, inorganic pigments, such as titanimum dioxide, zinc oxide, iron oxides, carbon black, ultramarine, lead colours, or bronze powders such, for example, as aluminum, copper or brass, either in the finely powdered state or in the form of lamellae or scales, and organic pigments, for example, vat dyestuffs, azo-dyestuffs and phthalocyanines.

As materials to be printed, there come into consideration, for example, sized or unsized paper, natural or regenerated cellulose, acetyl-cellulose, animal fibres, synthetic fibres of polyacrylonitrile, polyvinyl chloride, per polyamides, polyesters, glass fibres, asbestos fibres, artificial leather, feathers and foils of all kinds.

The pigments are advantageously used in the form of aqueous dispersions which may be prepared in known manner, for example by triturating a pigment powder with a polyhydric alcohol, water and a dispersing agent. Such pigment dispersions may also be prepared by grinding an aqueous press cake of a pigment dyestuff with a dispersing agent, such as a fatty alcohol sulphonate, a cellulose ether or a water-soluble polymeric carboxylic acid or salt thereof, a cendensation product of a naphthalene sulphonic acid derivative and formaldehyde.

A pigment dispersion prepared from a pigment powder generally contains the pigment in a coarser form than a dispersion prepared from a press cake, and this may often be disadvantageous in the printing process, for example, in that the pigments deposit in the engraving. On the other hand, a pigment dispersion prepared from a press cake of a pigment dyestuff with the aid of a dispersing agent has the disadvantage that the hydrophilic dispersing agent impairs the adhesion of the film of pigmented artificial resin to the support, especially if the film has to be repeatedly subjected to wet treatments. Moreover, the preparation of pigment dispersion from press cakes has the disadvantage that water-soluble impurities present in the water of the press cake, especially electrolytes, remain in the pigment dispersions and cause deposition of the pigment when they are worked up into printing pastes of padding liquors. When the known oil in-water-emulsion thickenings are used, the content of electrolyte often impairs the stability of such emulsion systems.

These disadvantages inherent in known pigment dispersions can be overcome by adding to the dye bath or printing paste a pigment dispersion prepared by mixing the acid resin with the aqueous press cake of a pigment dyestuff in a neutral or acid medium, if desired, at a raised temperature, mechanically treating the mixture so obtained, removing the water which separates out, and treating the resulting pigment preparation with an alkaline liquid, preferably with aqueous ammonia.

In addition to their excellent stability and resistance to cold, pigment dispersions so prepared have the advantage that printing pastes made up with such dispersions do not tend to deposit in the engraving of the roller nor to clog the stencil gauze. Owing to the very fine dispersion of the pigment there are produced stronger and purer prints and dyeings, and owing to the absence of large amounts of hydrophilic auxiliaries prints and dyeings of better fastness to washing.

The aqueous alkaline solution of the acid resin present in the pigment dispersion used in this invention acts both as a dispersing agent and binding agent for the pigment. However, this does not preclude the use in certain cases of these pigment dispersions in admixture with additional substances, for example, an emulsifier. Such an addition is especially desirable when oil-in-water-emulsion thickeners are used. However, it is always possible to use substantially smaller amounts of additional substances than are required with pigment dispersions other than those used in the present invention.

A further binding agent may be added when the pigment dispersion is worked up into a printing paste or dye bath. For this purpose there may be added an aqueous alkaline solution of the resinous condensate containing carboxylic groups already present in the pigment dispersion or a corresponding solution of another acid resin. Finally, there may be added other natural or artificial film-forming substances, which may or may not contain reactive groups, provided that such substance is compatible with the alkaline aqueous paste present.

In the process of the present invention the pigment, the alkali-soluble resinous condensate containing reactive groups, the polyfunctional compound and any other addition may be applied simultaneously or in succession to the fibrous material in the usual manner, for example, by padding, spraying, coating or printing, and then the fibrous material is dried at the ordinary or a raised temperature or steamed for a short time.

The above described combination of binding agents, besides being used for the fixation of pigments, can be used for the fixation of finely cut, dyed or undyed textile fibres, so-called "fibre dust." For this purpose the printing paste, which may or may not contain a pigment dyestuff, is printed on a fabric and, while still moist, dusted with fibre dust, usually in an electrostatic field and, after drying the material and removal the excess of fibre dust, fixation is carried out at a temperature above about 60° C. by steaming or dry heating.

The process of this invention may also be carried out, for example, by first dyeing the entire fibrous material unformly with a pigment dyestuff, then printing thereon a single colour or multi-colour pattern with a pigment dyestuff or dyestuffs, and fixing the ground dyeing and the printed colour or colours in a single operation. Owing to the alkaline character of the printing colours, it is possible to produce colour resists under oxidation dyestuffs. For example, a pigment printing colour of the usual composition may be applied to a fabric previously impregnated with a padding solution of Aniline Black, and the fabric subsequently steamed. The reserving action of the ammoniacal printing colour may be increased by the addition of a further substance of alkaline reaction. As substances suitable for this purpose there may be mentioned, for example, mono-, di- or triethanolamine; there may also be added reducing substances, such as sulphites or bisulphites. Additions having a mechanical reserving action, for example, titanium dioxide, zinc oxide or emulsified waxes, may also be added as agents for increasing the reserving action. When pigments are used that resist discharge, a reducing agent, for example, formaldehyde-sulphoxylate (sodium salt), may be added to the pigment printing paste. When such a printing paste is applied to a fabric that has previously been dyed with a dischargeable dyestuff, the destruction of the ground dyeing and the fixation of the pigment can be performed by subsequently steaming the fabric.

An important advantage of the process of this invention is that the fixation of pigments or other classes of dyestuffs, such as vat dyestuffs, mixtures of stabilized diazo-compounds and naphtholates, water-soluble esters of leuco vat dyestuffs, can be brought about by a short steaming operation without subjecting the material to a heat treatment. For printing on a fabric, which has been pretreated with a naphtholate, a dyestuff pigment and also a stabilized diazo-compound, it suffices to add a small amount of a potentially acid substance, for example, an ammonium salt of an acid, to the pigment printing paste in order to ensure fixation of the pigment dyestuff on the fibre by a short steaming operation.

The following examples serve to illustrate the invention, but they are not intended to limit it thereto, the parts being by weight unless otherwise stated, and the relationship of parts by weight to parts by volume being the same as that of the kilogram to the litre.

EXAMPLE 1

20 parts of triethanolamine, 50 parts of water and 40 parts of an aqueous solution of 30 percent strength of an alkyl-aryl polyglycol ether are added, while stirring, to 330 parts of an ammoniacal solution of 30 percent strength of an alkali soluble alkyd resin melted with dibutyl phthalate and prepared by condensing at 160° C. 1 mol of 1:3:5-hexane-triol with 1.25 mols of phthalic anhydride in the presence of 0.1 mol of cetyl alcohol and a small amount of boric acid, the condensation being carried out in such a manner that a product still soluble in alkali is obtained. Into the resulting mixture are incorporated by means of a rapid stirrer 200 parts of solvent benzene having a boiling range of 150°–190° C., and 160 parts of a petroleum fraction having a boiling range of 180°–220° C. 800 parts of an oily mobile emulsion are obtained.

Composition of printing paste 800 parts of the stock emulsion described above,
120 parts of a press cake of 25 percent strength of the blue dyestuff obtainable as described in Example 1 of German specification 693,610 mixed with sodium 2:2′-dinaphthyl-methane-6:6′-disulphonate,
80 parts of an aqueous solution of 50 percent strength of the reaction product of phosphorus oxychloride and 3 mols of ethylene imine.

1000 parts

A fabric of polyacrylonitrile fibres is printed with the printing paste described above, dried and then heated for 10 minutes at 160° C. A blue print is produced of good fastness to washing.

The same result is obtained by applying the polyfunctional ethylene imine compound to the fabric before or after the printing process. If the fabric is printed with a pigment dyestuff and also a dyestuff which is fixed by steaming, for example, a vat dyestuff or a sulphuric acid ester of a leuco vat dyestuff, the steaming operation fixes the pigment fast to washing so that it withstands the usual soaping treatment at the boil, required for finishing the illuminating dyeing with a dyestuff of another class.

EXAMPLE 2

20 parts of ammonia solution of 25 percent strength, 50 parts of water and 70 parts of an aqueous solution of 25 percent strength of triethanol-ammonium caseinate are added, while stirring, to 300 parts of an ammonical solution of 30 percent strength of an alkali-soluble alkyd resin obtained by condensing at 160° C. 0.75 mol of 1:3:5-hexane-triol and 0.25 mol of pentaerythrite with 1.2 mols of phthalic anhydride in the presence of a small amount of boric acid, the condensation being carried out in such a manner that a product is obtained which is just soluble in dilute aqueous solution of ammonia. Into the mixture so obtained 100 parts of xylene and 290 parts of benzene are introduced by means of a rapid stirrer, and a mobile paste is obtained.

Composition of the Printing paste 830 parts of the stock paste described above are stirred by means of a rapid stirrer with
100 parts of an aqueous solution of 30 percent strength of the reaction product of hexane-1:6-diisocyanate and 2 mols of ethylene imine, and to the resulting mixture are added
70 parts of a ground paste of 25 percent strength of the red azo-dyestuff No. 86 described in Schultz, Farbstofftabellen, 7th edition.

1000 parts

With the printing paste so obtained a fabric of polyamide fibres is printed, dried and then fixed either by a short steaming operation or by a heat treatment at 100°–150° C.

EXAMPLE 3

A fabric of lustrous cuprammonium rayon is padded with a padding liquor prepared as follows:

200 parts of an ammonical solution of 30 percent strength of an alkali-soluble alkyd resin obtained by condensing for 8 hours at 170° C. 0.9 mol of glycerine and 0.1 mol of 1:4-butylene glycol with 0.8 mol of phthalic anhydride and 0.35 mol of adipic acid in the presence of a small amount of boric acid, the condensation being carried out in such a manner that a product still soluble in alkali is obtained.
100 parts of an aqueous solution of 4 percent strength of the sodium salt of cellulose glycollic acid,
100 parts of an aqueous dispersion of 40 percent strength of a copolymer obtained from vinyl acetate, acrylic acid butyl ester and acrylic acid,
30 parts of ammonia solution of 25 percent strength,
35 parts of the reaction product of propyl disulphochloride and 2 mols of ethylene imine, and
250 parts of a paste of 40 percent strength of titanium dioxide are made up to
1000 parts by volume by the addition of water.

After drying the fabric, the dyestuff is fixed as described in Examples 1 and 2. A mat effect of good fastness to washing is produced.

EXAMPLE 4

A solution is prepared which consists of 50 grams of a solution of 25 percent strength of ammonium caseinate, 60 grams of water, 10 grams of 1-ethoxy-2-acetoxyethane (ethyl-glycol acetate), 20 grams of an aqueous solution of 30 percent strength of an alkyl-aryl sulphonate, 0.3 gram of sodium pentachlorophenolate, 5 grams of diethanolamine, 5 grams of an aqueous solution of 50 percent strength of ammonuim thiocyanate and 10 grams of urea.

In the solution so prepared are emulsified by means of a rapid stirrer 440 grams of a solution of 5 percent strength of polyisobutylene in a petroleum fraction having a boiling range of 170°–220° C. Into 600 grams of the highly viscous paste so obtained are introduced, while stirring, 250 grams of a dyestuff paste consisting of 12 parts of the yellow azo dyestuff obtainable by coupling diazotized 2-nitro-4-chloraniline with 2-chloracetoacetic acid anilide, 30 parts of the alkali-soluble alkyd resin described in Example 2, 5 parts of ammonia solution of 25 percent strength and 53 parts of water.

To the paste so obtained are finally added, while stirring, a further 70 grams of an aqueous solution of 50 percent strength of the reaction product of phosphorus oxychloride with 3 mols of ethylene imine and 80 grams of water, whereby 1000 grams of a smooth mobile printing paste are obtained.

A fabric of regenerated cellulose is printed with this printing paste, and steamed for 3–5 minutes in the rapid ager. A brilliant yellow print is obtained of a good fastness to washing and light.

EXAMPLE 5

One part of the printing paste described in Example 4 is diluted with 3 parts of water, and mixed with 1/25 part of an alkyl-aryl sulphonate. A fabric of poly-acrylonitrile fibres is padded with the solution so obtained, dried and then heated for 10 minutes at 150° C.

EXAMPLE 6

The printing paste described in Example 4 is printed on a cotton fabric without the addition of the reaction product of 1 mol of phosphorus oxychloride with 3 mols of ethylene imine, and the printed fabric is then padded with an aqueous solution of 5 percent strength of the reaciton product of the tri-isocyanate of 1:3-dimethyl-2:4:6-triaminobenzene with 3 mols of ethylene imine. The fabric is dried and then steamed for 5 minutes in a rapid ager.

EXAMPLE 7

550 parts of a solution of 10 percent strength in butyl acetate of an alkali-soluble alkyd resin obtained by condensing 1 mol of hexane-triol-(1:3:5) with 1.2 mols of phthalic anhydride are introduced, while stirring, into 350 parts of an aqueous solution of 6 percent strength of sodium lauryl sulphonate, whereby a mobile dispersion of the resin is formed.

50 parts of a paste of 30 percent strength obtained by grinding iron oxide in butyl acetate are then added and, after the addition of 20 parts of the reaction product of diethyl oxalate with 4 mols of ethylene imine, the paste is made up to 1000 parts by adding water. A fabric of glass fibres is printed with the printing paste so obtained, dried and then heated at 140° C.

EXAMPLE 8

210 parts of an aqueous solution of 47.5 percent strength prepared by dissolving the acid resin (obtained by condensing at 160° C., while stirring, for 20 hours 1 mol of pentaerythritol, 0.1 mol of stearic acid and 1.9 mols of phthalic anhydride) with the addition of 20 grams of cumarone resin (melting point: 116° C.) and 3 grams of boric acid, and subsequently dissolving the mixture so obtained by adding ammonia, are stirred with 10 parts of monoethanolamine and 590 parts of an oil-in-water-emulsion prepared as follows:

60 parts of an ammonium caseinate solution of 25 percent strength are mixed with 0.5 part of diethanolamine, 15 parts of an alkyl-aryl polyglycol ether, 15 parts of ethylene glycol and 129.5 parts of water. After the addition of 5 parts of tri-isobutyl phosphate, 775 parts of petroleum are introduced, while stirring rapidly, into the solution, whereby a mobile emulsion is produced.

To the emulsion so obtained are added 60 parts of an aqueous paste of 35 percent strength of copper phthalocyanine and 60 parts of phosphoric acid diethylamide-diethylene imide and the emulsion is made up to 1000 parts with water. The printing paste so obtained is printed on cotton together with a mixture of a stabilized diazo-compound and a naphtholate. The printed fabric is dried, then steamed for 5 minutes in the presence of acetic acid, rinsed and soaped at the boil.

EXAMPLE 9

6 parts of a rubber latex of 60 percent strength are introduced, while stirring, into 300 parts of an ammoniacal solution of 30 percent strength of the condensation product prepared from 1 mol of hexane-triol-(1:3:5) and 1.2 mols of phthalic anhydride. To the mixture so obtained are added 200 parts of a tragacanth solution of 6 percent strength and 300 parts of an oil-in-water-emulsion prepared as follows:

80 parts of an ammonium caseinate solution of 25 percent strength are mixed with 1 part of triethanolamine, 15 parts of a condensation product prepared from dodecyl alcohol and 20 mols of ethylene oxide, and 150 parts of water. Into the solution so obtained are introduced by means of a rapid stirrer 754 parts of a benzine having a boiling range of 160°–230° C., whereby a mobile emulsion is formed. To the emulsion are added 120 parts of an aqueous paste of 35 percent strength prepared by grinding lampblack with 40 parts of the reaction product of 1 mol of cyanuric acid chloride with 3 mols of ethylene imine, and the mixture is then made up to 1000 parts by the addition of water. With the paste so obtained a fabric of acetyl-cellulose is printed, and then heated for 15 minutes to 90° C.

EXAMPLE 10

520 parts of the oil-in-water emulsion described in Example 9 and 80 parts of a ground paste of 25 percent strength of the red azo-dyestuff No. 86 described in Schultz, Farbstofftabellen, 7th edition, are added, while stirring, 300 parts of an ammoniacal solution of 30 percent strength of the condensation product prepared from 1 mol of hexane-triol-(1:3:5) and 1.2 mols of phthalic anhydride. Finally, 100 parts of diglycide ether are added to the mixture so formed. With the paste so obtained a mercerized cotton fabric is printed, dried and then heated for 10 minutes at 150° C.

EXAMPLE 11

440 parts of a solution of 5 percent strength of rubber in a petroleum fraction having a boiling range of 170°–220° C. are emulsified in a solution consisting of 50 grams of an ammonium caseinate solution of 25 percent strength, 60 grams of water, 10 grams of 1-ethoxy-2-acetoxyethane (ethylglycol acetate), 20 grams of an aqueous solution of 30 percent strength of an alkyl-aryl sulphonate, 0.3 gram of sodium pentachlorophenolate, 5 grams of diethanolamine, 5 grams of an aqueous solution of 50 percent strength of ammonium thiocyanate and 10 grams of urea. Into 600 grams of the highly viscous paste so obtained are introduced, while stirring, 250 grams of a dyestuff paste consisting of 12 parts of the yellow azo-dyestuff obtainable by coupling diazotized 2-nitro-4-chloraniline with 2-chloracetoacetic acid anilide, 30 parts of the alkali-soluble alkyd resin described in Example 2, 5 parts of ammonia of 25 percent strength and 53 parts of water.

To the mixture so obtained are finally added 70 grams of an aqueous solution of 50 percent strength of the reaction product of phosphorus oxychloride with 3 mols of ethylene imine and 80 grams of water, whereby 1 kilogram of a smooth mobile printing paste is obtained.

A fabric of regenerated cellulose is printed with the printing paste so obtained, and then steamed for 3–5 minutes in a rapid ager. A brilliant yellow print is obtained of good fastness to washing and light.

EXAMPLE 12

An oil-in-water-emulsion is prepared by introducing, while stirring, 700 parts of a petroleum distillate having a boiling range of 190°–220° C. into an aqueous solution consisting of 60 parts of an ammonium caseinate solution of 25 percent strength, 150 parts of an ammoniacal solution of 40 percent strength of the condensation product prepared from 1 mol of hexane-triol-(1:3:5) with 1.2 mol of phthalic anhydride, 1 part of ammonium thiocyanate, 10 parts of an alkyl-aryl polyglycol ether, and 79 parts of water.

*Composition of the printing paste*

200 parts of the pigment dispersion obtained as described in Example 1 of U.S. pat. appln. Ser. No. 453,148, now abandoned (containing 15 percent of Hansa yellow G, G. Schultz, Farbstofftabellen, 7th edition, No. 84, 30 percent of the condensation product, in the form of the ammonium salt, prepared from 1 mol of hexane-triol-(1:3:5) and 1.2 mols of phthalic anhydride and 55 percent of water) are stirred with 700 parts of the emulsion described above,
25 parts of a solution of 80 percent strength in toluene of the reaction product of 1 mol of phosphorus oxychloride with 3 mols of ethylene imine,
25 parts of a solution of 80 percent strength in benzene of the reaction product obtained by reaction of 1 mol of phosphorus thiochloride with 3 mols of ethylene imine in the presence of an acid-binding agent, and
50 parts of water.

1000 parts.

A fabric of staple fibres of regenerated cellulose is printed with the mobile printing paste so obtained by machine printing, dried and then steamed for 5 minutes at 70° C. in a rapid ager. A brilliant yellow print is obtained of good fastness to washing and light.

EXAMPLE 13

An oil-in-water emulsion is prepared as follows; 650 parts of a petroleum fraction having a boiling range of 190°–220° C. are introduced, while stirring, into an aqueous solution of 100 parts of an ammonium caseinate solution of 25 percent strength, 10 parts of an alkyl-aryl polyglycol ether, 130 parts of an ammoniacal solution of 30 percent strength of a copolymer of 90 parts of vinyl propionate and 10 parts of crotonic acid, and 110 parts of water.

*Composition of the printing paste*

130 parts of a pigment dispersion obtained in a manner analogous to that described in Example 1 of U.S. pat. appln. Serial No. 453,148, now abandoned (containing 12 percent of copper phthalocyanine blue, 30 percent of the condensation product, in the form of the ammonium salt, prepared from 1 mol of hexane-triol-(1:3:5) and 1.2 mols of phthalic anhydride, and 58 percent of water) are mixed with
650 parts of the emulsion described above,
100 parts of diglycide ether and
120 parts of water.

1000 parts by volume.

With the printing paste so obtained a cotton fabric is printed, dried and then heated for 10 minutes at 150° C. A blue print is obtained of good fastness to washing.

Instead of 100 parts of diglycide ether there may be used 100 parts of di-epoxy-butane. A cotton fabric printed with the printing paste so obtained is steamed for 7 minutes at 101° C. with saturated steam. A blue print is obtained of good fastness to washing.

EXAMPLE 14

100 parts of an aqueous pigment paste of 20 percent strength of the yellow dyestuff obtainable by coupling diazotized 2-nitro-4-chloraniline with 2-chloroacetoacetic acid anilide are stirred with 300 parts of an ammoniacal solution of 30 percent strength of the condensation product obtained from 1 mol of hexane-triol-(1:3:5) and 1.2 mols of phthalic anhydride,
350 parts of a dispersion of 50 percent strength of polyvinyl acetate in a fine state of dispersion,
70 parts of a dispersion of 50 percent strength of polyvinyl propionate in a coarse state of dispersion,
30 parts of triethanolamine,
20 parts of potassium sulphite solution of 45° Bé.
100 parts of the oil-in-water emulsion described in Example 9, and
30 parts of a solution of 90 percent strength of the reaction product of 1 mol of phosphorus oxychloride with 3 mols of ethylene imine, 1000 parts A cotton fabric, which has been pretreated with a padding solution of aniline black of the usual composition, is printed with the above printing paste, then dried and subjected for 7 minutes at 101° C. to the action of saturated steam. The printed fabric is then after-treated for about 30 seconds at 60° C. with 3 grams of calcined sodium carbonate and 3 grams of sodium bichromate, rinsed and soaped at the boil. A bright yellow resist of very good fastness to washing is obtained.

EXAMPLE 15

16 parts of an aqueous pigment paste of 25 percent strength of copper phthalocyanine are stirred with
16 parts of an ammonium caseinate solution of 25 percent strength,
5 parts of an aqueous solution of 30 percent strength of the reaction product of an alkyl-phenol with ethylene oxide,
25 parts of an ammoniacal solution of 30 percent strength of the condensation product of 1 mol of hexane-triol-(1:3:5) with 1.2 mols of phthalic anhydride,
15 parts of a coarsely dispersed dispersion of polyvinyl acetate,
10 parts of a solution of 80 percent strength of the reaction product of 1 mol of phosphorus oxychloride with 3 mols of ethylene imine and
50 parts of a tragacanth solution of 6 percent strength, and the paste is then made up to 1000 parts by volume with water.

With the padding liquor so obtained mercerized poplin of cotton is padded, dried and steamed for 7 minutes under neutral conditions. A level dyeing of good fastness to washing is obtained.

EXAMPLE 16

15 parts of a pigment dispersion prepared as described in U.S. pat. appln. Ser. No. 453,148, now abandoned (containing 15 percent of phthalocyanine green, 30 percent of the condensation product, in the form of the ammonium salt, of 1 mol of hexane-triol-(1:3:5) with 1.2 mols of phthalic anhydride in the form of the ammonium salt and 55 percent of water) are stirred with
5 parts of ammonia solution of 25 percent strength,
60 parts of an oil-in-water emulsion containing 3.5 percent of polyisobutylene having a molecular weight of 150,000 in the oily phase and 5 percent of the above described condensation product of hexane-triol with phthalic anhydride dissolved in the aqueous phase,
12 parts of a solution of 80 percent strength in benzene of the reaction product of 1 mol of phosphorus oxychloride with 3 mols of ethylene imine, the product having been heated at a temperature below 100°

C. until, when cooled, it has a viscous consistency and is still soluble in water, 30 parts of a solution of 5 percent strength of carboxymethyl-celluose and 30 parts of a tragacanth solution of 6 percent strength, and the whole is made up with water to 1000 parts.

With the padding liquor so obtained a mixed fabric of cotton and regenerated cellulose is padded, dried and then heated for 10 minutes at 135° C. A uniform dyeing of good fastness to washing is obtained.

EXAMPLE 17

100 parts of a pigment paste of 20 percent strength of copper phthalocyanine are stirred with 320 parts of a solution of 30 percent strength of the condensation product of 1 mol of hexane-triol-(1:3:5) with 1.2 mols of phthalic anhydride, 400 parts of the oil-in-water-emulsion described in Example 9, 30 parts of the reaction product of 1 mol of phosphorus oxychloride with 3 mols of ethylene imine, 30 parts of an aqueous solution of 30 percent strength of ammonium sulphate 5 parts of a sodium bisulphite solution of 38° Bé. and 115 parts of water.

1000 parts.

A cotton fabric, which has been pretreated in the usual manner with 10 grams of hydroxynaphthoic acid anilide and 12 cc. of sodium hydroxide solution of 38° Bé., is printed with the above printing paste and also a printing paste containing a diazotized aromatic amine. The printed fabric is dried, passed through a warm bath (30° C.) of 2.5 grams of sodium hydroxide solution of 38° Bé., then rinsed and soaped at the boil. A brilliant red-blue article is obtained of a good fastness to washing.

EXAMPLE 18

Instead of the ammonium sulphate solution and sodium bisulphite solution used for the preparation of the printing paste described in Example 17, there are used 35 parts of sodium formaldehyde-sulphoxylate. A fabric of viscose rayon, which has been dyed with a dischargeable dyestuff, is printed with the printing paste so obtained. The fabric is then dried and steamed for 5 minutes in a rapid ager. A blue colour discharge effect is produced, the brilliancy of which can be enhanced by rinsing and soaping for a short time at 40–60° C.

We claim:

1. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals, drying the impregnated material and then heating the same.

2. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals in the presence of a thickening agent formed by substances swelling in water, drying the impregnated material and then subjecting the same to a steaming operation.

3. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals in the presence of a thickening agent formed by an oil-in-water emulsion of an organic solvent only sparingly soluble in water, drying the impregnated material and then subjecting the same to a steaming operation.

4. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals, drying the impregnated material and then subjecting the same to a steaming operation.

5. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals in the presence of a thickening agent formed by substances swelling in water, drying the impregnated material and then heating the same.

6. The process which comprises applying to fibrous material a pigment, a resinous alkali-soluble condensation product of polyvalent organic acids and polyhydric aliphatic alcohols containing reactive carboxylic groups dissolved in an alkaline medium, and a compound containing at least two reactive radicals selected from the group consisting of ethylene imine radicals and of alkylene oxide radicals in the presence of a thickening agent formed by an oil-in-water emulsion of an organic solvent only sparingly soluble in water, drying the impregnated material and then heating the same.

References Cited in the file of this patent

UNITED STATES PATENTS

| | | |
|---|---|---|
| 2,259,225 | Kienle | Oct. 14, 1941 |
| 2,317,965 | Bestian | Apr. 27, 1943 |
| 2,511,113 | LaPiana | June 13, 1950 |
| 2,550,047 | Durr | Apr. 24, 1951 |
| 2,618,616 | Tess | Nov. 18, 1952 |
| 2,683,131 | Cass | July 6, 1954 |
| 2,691,007 | Cass | Oct. 5, 1954 |
| 2,760,945 | Bodenschatz | Aug. 28, 1956 |

OTHER REFERENCES

Pense: Abstract of application Serial Number 361,011, published October 14, 1941, O.G.